United States Patent [19]

Ganoung

[11] Patent Number: 5,045,035

[45] Date of Patent: Sep. 3, 1991

[54] HIGH-EFFICIENCY POWERTRAIN

[76] Inventor: David P. Ganoung, 2800½ Candelaria NW., Albuquerque, N. Mex. 87107

[21] Appl. No.: 516,433

[22] Filed: Apr. 30, 1990

Related U.S. Application Data

[63] Continuation-in-part of Ser. No. 145,568, Jan. 19, 1988, Pat. No. 4,964,318.

[51] Int. Cl.$^5$ .............................................. F16H 47/08
[52] U.S. Cl. ........................................ 475/42; 475/49; 475/210; 192/331
[58] Field of Search .................. 192/3.3, 3.31; 475/43, 475/49, 51, 65

[56] References Cited

U.S. PATENT DOCUMENTS

| | | | |
|---|---|---|---|
| 3,090,255 | 5/1963 | Smirl et al. | 475/42 X |
| 3,473,411 | 10/1969 | Paredes | 475/49 |
| 4,377,226 | 3/1983 | Chevalier et al. | 192/3.31 X |
| 4,946,429 | 8/1990 | Sherman | 475/210 |
| 4,964,318 | 10/1990 | Ganoung | 74/859 |

Primary Examiner—Dirk Wright

[57] ABSTRACT

A powertrain for passenger cars includes a high specific output engine coupled to an automatic transmission which is expanded from four to five forward speed ratios by a novel two-speed torque converter assembly within the transmission. Both of hydrodynamic action and an integral planetary gearset contribute to torque multiplication provided by the high-stall-speed torque converter when it is in its lower speed ratio, and engagement of a lockup clutch simultaneously deactivates both sources of torque multiplication to thereby establish a 100% efficient one-to-one speed ratio across the converter. Also included in the powertrain in a control system which secures high transmission efficiency early during vehicle acceleration by employing lockup of the torque converter as the first of the four upshifts for the five-speed transmission. Another control system utilizes a drive-by-wire type of engine throttle valve to implement an aggressive gearshift schedule and to limit engine intake air flow under stall conditions of the torque converter. These powertrain features exploit the fuel economy potential of modern high specific output engines and more effectively manage the characteristically peaky torque curve of such engines.

20 Claims, 5 Drawing Sheets

| | LOCKUP CL. 23 | C1 | C2 | B1 | B2 | B3 | RATIO | RATIO GAP |
|---|---|---|---|---|---|---|---|---|
| R | | | X | | X | | -3.16 | |
| 1ST | | | X | | | X | 2.98 | |
| 2ND | X | | X | | | X | 2.14 | 1.395 |
| 3RD | X | X | | | | X | 1.35 | 1.585 |
| 4TH | X | X | X | | | | 1 | 1.349 |
| 5TH | X | X | | X | | | 0.694 | 1.442 |

FIGURE 6

HIGH-EFFICIENCY POWERTRAIN

CROSS REFERENCE TO RELATED APPLICATIONS

The present application is a continuation-in-part of my copending application Ser. No. 07/145,568, filed Jan. 19, 1988 and entitled "Engine Control Apparatus for Improved Fuel Economy." This copending application is now U.S. Pat. No. 4,964,318.

BACKGROUND OF THE INVENTION

1. Field of the Invention

This invention relates to engine control for improved fuel efficiency, and more specifically to fuel economy benefits achieved largely through refinement of automatic transmissions currently used in automotive applications.

2. Description of the Prior Art

Current production cars with automatic transmissions have several short comings with regard to fuel economy. Most notable among these is energy dissipated as heat in the transmission torque converter due to the fact that converter lockup clutch engagement often does not occur during city driving until vehicle acceleration is essentially complete.

Another major problem concerns the modern engine designs which achieve an unusually good combination of performance and fuel economy by producing high power output relative to piston displacement. Such high specific output engines are only rarely available with automatic transmissions, in no small part because the high torque converter stall speeds desirable with high specific output engines exacerbate converter overheating. In addition, an extra forward speed ratio would much improve the results achieved using automatic transmissions in conjunction with high specific output engines.

SUMMARY OF THE INVENTION

In view of the above, it is therefore an object of the invention to present an automotive powertrain which exploits the fuel economy potential of modern high specific output engines.

It is another object of the invention to provide a two-speed torque converter which enhances the automatic transmissions currently used in passenger cars.

It is still another object of the present invention to provide an improved automatic transmission in which torque converter lockup accompanies the very first upshift to thereby eliminate hydrodynamic losses very early during acceleration of an associated motor vehicle.

It is yet another object to present apparatus for limiting power dissipated in a torque converter or fluid coupling subjected to stall conditions.

These and other objects, features and advantages will become apparent to those skilled in the art when read in conjunction with the appended claims and the accompanying drawing.

In accordance with the present invention in its broad aspect, a power transmission device is presented. The device includes a powershift geartrain unit and a two-speed hydrodynamic torque converter coupled to deliver power to the powershift unit. Since upshifting and lockup occur simultaneously in the two-speed torque converter, a control system for the transmission utilizes lockup of the converter as the very first overall upshift before proceeding with the first upshift of the powershift unit as the second upshift for the overall transmission device. In this way, torque converter lockup accompanies the very first overall upshift and remains in effect for all subsequent upshifts. Another control device limits power output from the associated engine when the torque converter output shaft is stalled.

BRIEF DESCRIPTION OF THE DRAWING

The present invention is illustrated in the accompanying drawing, in which.

In the figures of the drawing, like reference numerals denote like parts.

DESCRIPTION OF THE PREFERRED EMBODIMENT

Figure 1:
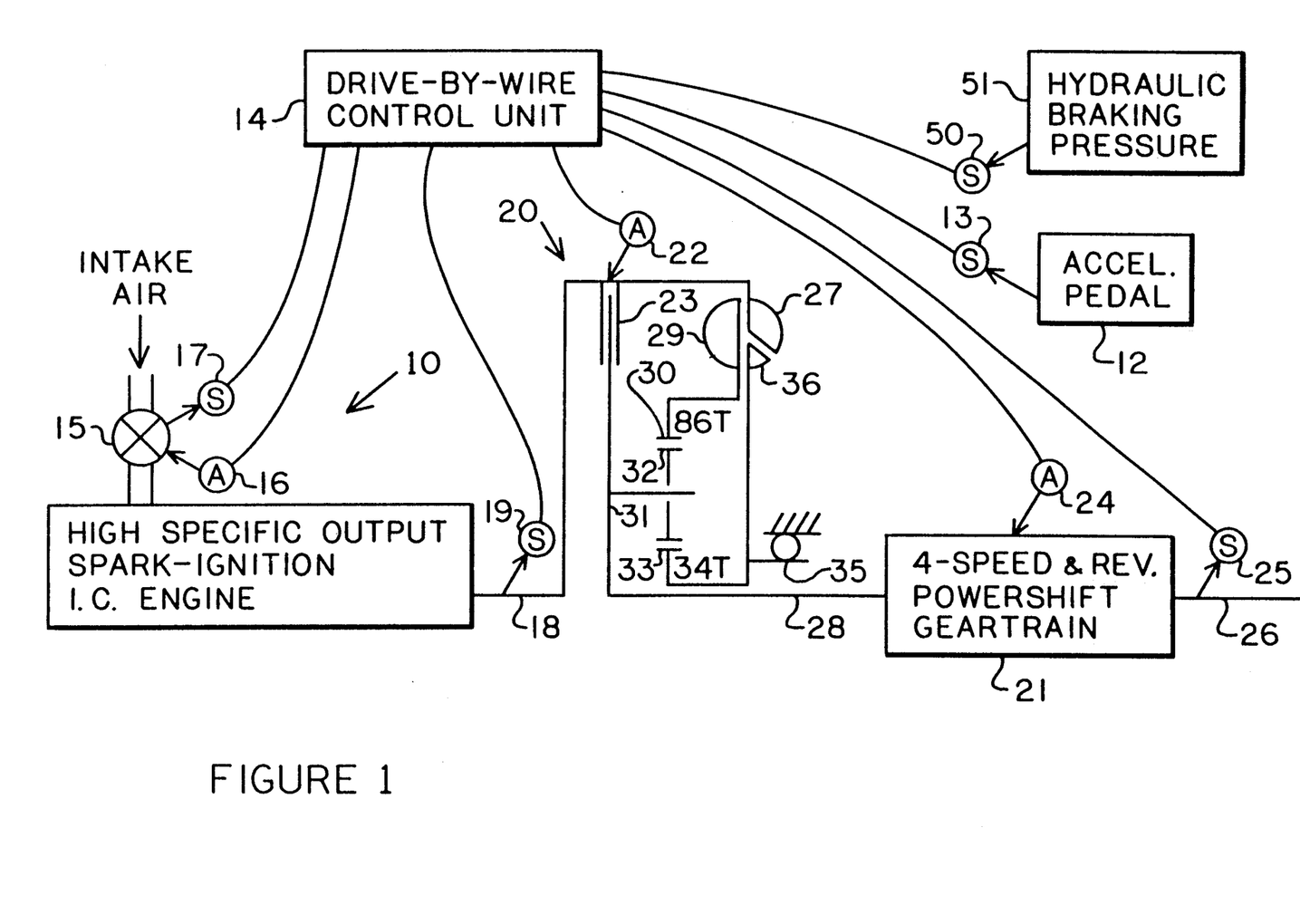
FIG. 1 is a schematic diagram of major components in an automotive powertrain according to the preferred embodiment of the invention.

FIG. 1 shows the salient features of an automotive powertrain which would embody a preferred variation of the present invention. This preferred embodiment includes a gasoline engine assembly 10, and all of the remaining components shown in FIG. 1 serve the pivotal function of controlling the operating conditions of the engine 10 in response to the position of the accelerator pedal 12 of the associated passenger car.

In particular, a sensor 13 measures the position of the pedal 12 and relays an electrical signal indicative of this position to an electronic control unit 14. This ECU 14 in turn determines the desired position of the intake air throttling valve 15 for the engine 10, and an electromechanical actuator 16 adjusts the position of the throttle valve 15 to secure this desired position. So that the ECU 14 can make appropriate adjustments of the throttle valve 15 via the actuator 16, for example using proportional-integral-derivative (PID) feedback control techniques, the sensor 17 measures the existing position of the throttle 15 and relays the corresponding feedback signal to the ECU 14.

These position sensors 13 and 17 are represented symbolically in FIG. 1 by the letter "S," for sensor, within a circle and with an arrow pointing to the sensor from the component being sensed. All other sensors shown in FIG. 1 also employ this representation even though these remaining sensors measure parameters other than position. Similarly, the encircled letter "A," for actuator, represents each actuator seen in FIG. 1, regardless of whether the actuator functions to enable a transmission gear ratio or to turn a throttle shaft; an arrow points from each actuator to the component being controlled. As shown, all of the sensors and actuators in FIG. 1 communicate electrically with the ECU 14.

Continuing now with the desired position of the engine throttle 15 as secured by the ECU 14 using the actuator 16 and sensor 17, this commanded position for the throttle 15 depends on the rotational speed of the engine crankshaft 18 as measured by the sensor 19, as well as on the position of the accelerator pedal 12. My U.S. Pat. No. 4,905,544 explains the preferred strategy which the ECU 14 employs for controlling the engine throttle 15, and also for selecting and enabling the active gear ratio in the transmission which includes the combination of the two-speed lockup torque converter assembly 20 with the 4-speed planetary geartrain assembly 21. Therefore, the entire disclosure of this U.S. Pat. No. 4,905,544 is incorporated in the present disclosure by reference.

In more detail of choosing the active gear ratio, the actuator 22 controls hydraulic pressure for engaging the torque converter lockup clutch 23, and the actuator system 24 controls hydraulic application pressures for all of the various brakes and clutches within the planetary geartrain assembly 21. The sensor 25 reads the current operating speed of the transmission output shaft 26 and relays the corresponding signal to the ECU 14, so that the ECU 14 can use this signal in conjunction with the power command signal from sensor 13 to choose the active gear ratio for the transmission comprised of assemblies 20 and 21. As already noted, the ECU 14 performs this function in the manner explained in U.S. Pat. No. 4,905,544.

Now considering the two-speed torque converter 20 in more detail, we see in FIG. 1 that the engine crankshaft 18 directly drives the hydrodynamic converter impeller 27, just as in a conventional torque converter. Also following current automotive practice is the location of the lockup clutch 23 such that full engagement of the clutch 23 locks the engine crankshaft 18 to directly drive the input shaft 28 of the planetary geartrain 21.

When the lockup clutch 23 is released, however, the torque converter turbine 29 drives the planetary geartrain input shaft 28 through auxiliary planetary speed reduction gearing basically like that used in the torque converters of millions of twin turbine Buick Dynaflow transmissions. More specifically, the ring gear 30 is welded, bolted or otherwise rigidly attached to the turbine 29, and the planet carrier 31 drives the geartrain input shaft 28 through a continuously engaged coupling such as that provided by splines. The example planet gear 32 on the carrier 31 of course meshed with teeth on each of the ring gear 30 and the sun gear 33. As noted next to the gears 30 and 33 in FIG. 1, the ring gear 30 has 86 teeth, and the sun gear 33 has 34 teeth, thus allowing four of the planet gear 32 to be equally spaced at 90 degree angles around the sun gear 33.

So while power from the engine 10 travels from the crankshaft 18 to the geartrain input shaft 28 through a solid one-to-one speed ratio when the lockup clutch 23 is engaged, it follows a much more circuitous, alternative powerpath when the clutch 23 is released. This alternative powerpath includes torque multiplication first hydrodynamically via the impeller 27 and turbine 29, and then mechanically through the planetary gearing comprising components 30, 31, 32 and 33. Each of these torque multiplication processes engenders a reverse reaction torque resisted by the single one-way clutch 35.

Unlike in Buick Dynaflow torque converters, the converter stator 36 and the sun gear 33 are rigidly joined together to permit the single sprag or roller type of overrunning clutch 35 to serve both of these torque reaction elements 33 and 36. Two separate overrunning clutches can nevertheless be employed in the converter 20 as a slightly more conventional alternative to the configuration shown, but the performance advantage of doing so is mitigated by the early engagement of the lockup clutch 23 that is inherent in the gearshift scheduling advanced in U.S. Pat. No. 4,509,544. In other words, engagement of the lockup clutch 23 will often occur before reverse reaction torque on the stator 36 diminishes to zero. Moreover, some forward reaction torque on the stator 36 can be accommodated, especially if the blades of the stator 36 are designed accordingly.

The reason for using the single overrunning clutch 35 to prevent reverse rotation of both of the sun gear 33 and the stator 36 is simply to promote compactness and low cost of the two-speed converter assembly 20. As another simplification, the stator 36 can be eliminated as the principal step in transforming the two-speed torque converter 20 into a two-speed lockup fluid coupling.

In a more direct comparison of the assembly 20 to the twin turbine Dynaflow type of torque converter, the lockup clutch 23 replaces the second turbine and associated stator of the Dynaflow converter to thus eliminate the consistently inefficient operation of the Dynaflow design, as well as its large size. In reality the Dynaflow design compactly nested its integral planetary gearset within the hollow center of the toroidal converter shape, and the consequent complete immersion of the integral planetary gearset in transmission fluid helped make gear noise imperceptible. In combination with both the advances made in gear manufacturing and the very brief intermittent periods of gear mesh action in the integral gearset of the converter 20, this complete immersion makes gear design features for even greater compactness and for lower cost of the converter 20 more practical. These features include spur gear teeth and possibly even plain bearings in place of the needle bearings normally used in automotive transmission applications of planetary gearing.

Figure 2:
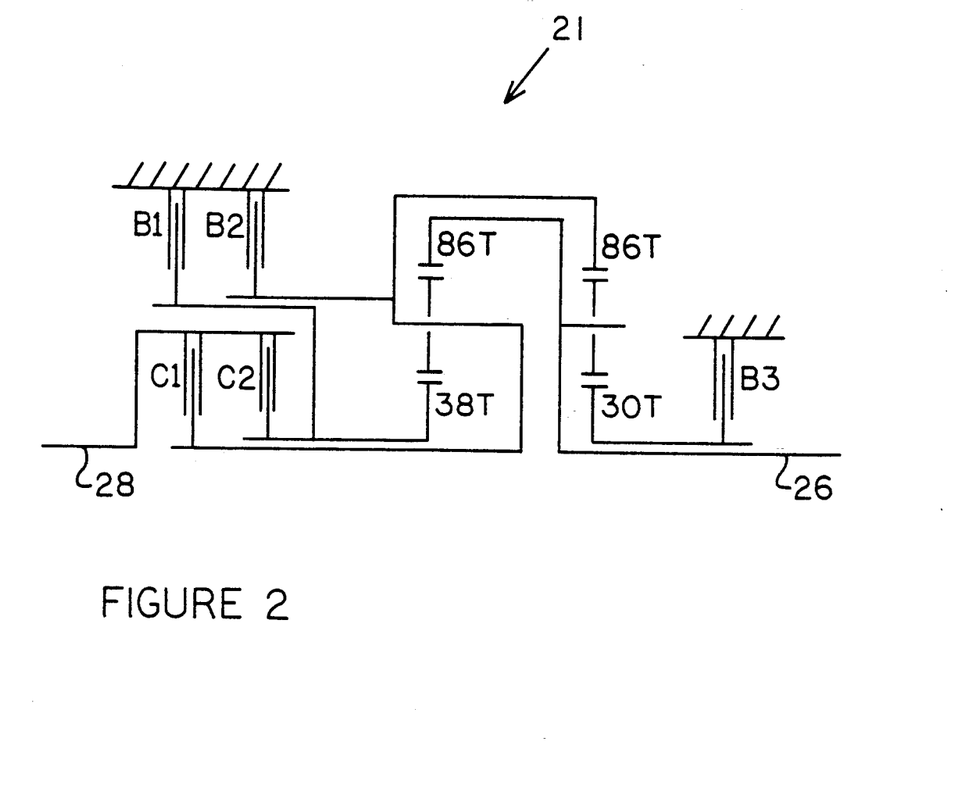
FIG. 2 is a diagram showing more detail of the 4-speed powershift geartrain assembly 21 in FIG. 1.
Figure 3:
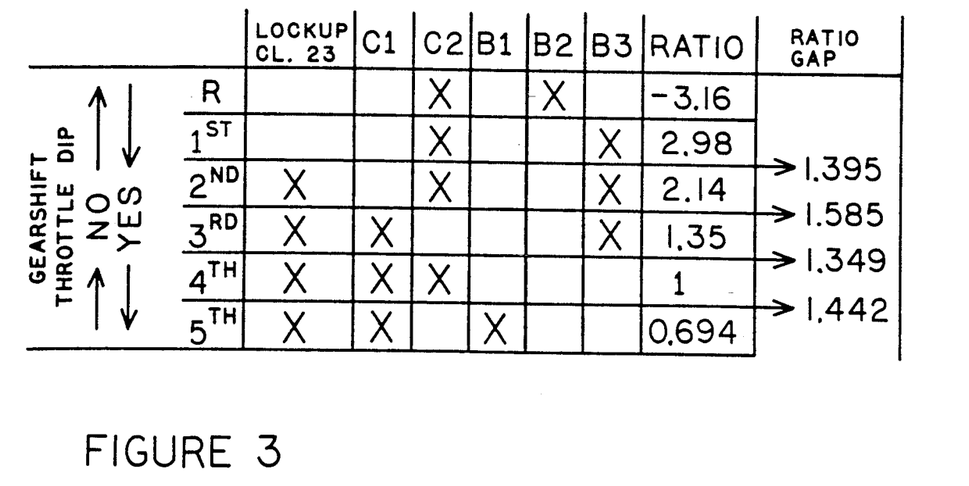
FIG. 3 is a clutch and brake application schedule encompassing the lockup clutch 23 in FIG. 1 and the brakes and clutches shown in FIG. 2.

Now considering the main geartrain 21 in more detail, FIG. 2 confirms that the planetary gearing and associated brakes and clutches in the assembly 21 are entirely conventional in their basic configuration. U.S. Pat. Nos. 4,368,649 and 4,509,389 provide more information about this configuration, and FIG. 3 reveals how the ECU 14, acting through the actuators 22 and 24, coordinates application of the lockup clutch 23 with application of the various brakes and clutches in the 4-speed geartrain 21. This schedule of application as shown in FIG. 3 provides five forward and one reverse transmission speed ratios. A second, higher reverse ratio with engine braking added is available simply by adding engagement of the lockup clutch 23 to the reverse gear represented in FIG. 3.

As an example of the transmission gear ratios shown in FIG. 3, the clutches 23 and C2 are applied along with brake B3 to activate 2nd gear. Using the gear tooth numbers specified in FIGS. 1 and 2, this 2nd gear provides a speed reduction ratio of 2.14 revolutions of the engine crankshaft 18 for every one revolution of the transmission output shaft 26. As a further example, upshifting from 2nd to 3rd gear is accomplished by properly coordinating release of clutch C2 with nearly simultaneous engagement of clutch C1. The resulting new gear ratio is 1.35 to one, thereby causing the speed of the engine crankshaft 18 to be reduced by the factor of 1.585 (which is the numerical gear ratio gap between 2nd gear and 3rd gear) when the 2nd-to-3rd upshift occurs at constant speed of the associated vehicle, and thus at constant RPM of shaft 26.

In contrast to all of the other numerical gear ratio gaps given in FIG. 3, the 1st-to-2nd ratio gap does not equal the engine speed reduction factor for executing the associated 1st-to-2nd upshift at constant vehicle speed because hydrodynamic torque multiplication and slippage in the converter 20 elevate speed of the engine crankshaft 18 before, but not after the upshift. This is one of the reasons why the 1st-to-2nd ratio gap listed in FIG. 3 deviates from the normal practice of using the widest ratio gap for the very first upshift. Another of these reasons for a comparatively narrow ratio gap for the 1st-to-2nd gearshift is that such gear ratio spacing encourages an even earlier transition to the efficient overall operation achieved with the lockup clutch 23 engaged. Two additional reasons relate to the specific embodiment of FIG. 1. Most obviously, the torque converter 20 provides torque multiplication in 1st gear beyond what is accounted for by gearing alone, and last, engine braking is not available until completion of the upshift to 2nd gear (but a friction clutch can replace or augment the overrunning clutch 35).

In operation of the passenger car which includes the components already described with reference to FIGS. 1, 2 and 3, acceleration of the car from rest begins using the combination of transmission brake and clutch application given in FIG. 3 for 1st gear. The first upshift, to 2nd gear, requires no change within the geartrain 21, but instead simply calls for engagement of the lockup clutch 23 in the two-speed torque converter 20. All subsequent upshifting reverses this situation by maintaining full engagement of the clutch 23 while changing the combination of brake and clutch application in the geartrain 21. As a result of continuous engagement of the lockup clutch 23 at all times after the first upshift (with the exception of during rapid vehicle braking), the 4-speed geartrain assembly 21 must dissipate a portion of the inertia energy released from the engine 10 when upshifting abruptly reduces rotational speed of the crankshaft 18. In other words, the hydrodynamic coupling of the impeller 27 to the turbine 29 is not available to dissipate any of this excess energy.

Therefore, only during the brief time interval when each upshift is in the process of being executed, the ECU 14 automatically adjusts the engine throttle 15 to a much more closed position than is required by the existing power command signal from the accelerator pedal sensor 13. Not only will this excess-energy-control technique obviate all need to redesign any of the clutches and brakes in the gear section of a completely conventional automatic transmission, but it will be instrumental in more than restoring any loss of gearshift smoothness otherwise attributable to locked-up gearshifting. FIG. 3 indicates the obvious restriction of this technique of dipping the engine throttle to gearshifts performed in the upshift direction.

As just suggested, the present invention can be implemented in current mass production of passenger cars without modifying the design of the gear section or case of production 3-speed and 4-speed automatic transmissions. From a slightly different viewpoint, a two-speed fluid coupling or torque converter as exemplified by the two-speed unit 20 in FIG. 1 will transform a conventional 4-speed automatic transmission into a 5-speed automatic transmission in which lockup accompanies the very first upshift. As mentioned in SAE paper 900160, such early activation of locked-up operation will not only by itself significantly improve fuel economy of the associated passenger car, but will play an essential role in a larger drive-by-wire engine control strategy for improving fuel economy. The disclosure of my copending U.S. patent application Ser. No. 07/145,568 also describes this larger engine control strategy.

Conversion of a production transmission using a two-speed hydrodynamic unit like the unit 20 is not limited to planetary geared transmissions, but also includes the countershaft type of automatic transmission favored by a prominent Japanese car company. The countershaft type of transmission allows greater flexibility in spacing of gear ratios, and the particular aspect of the present invention illustrated by the two-speed hydrodynamic assembly 20 provides a very compact way of adding an extra forward speed ratio to the basic countershaft type of automatic transmission.

Drive-by-wire throttle control enhances the conversion of conventional automatic transmissions using the two-speed converter 20 in place of a conventional lockup converter for another reason besides control of energy dissipated during the actual process of upshifting. Because locked-up operation must be abandoned soon enough to prevent declining speed of the transmission output shaft 26 from stalling the engine 10 during panic braking of the associated vehicle, the lockup clutch 23 must be quickly disengaged upon detection of rapid angular deceleration of shaft 26. This can be accomplished easily, but it is another matter to smoothly re-engage the clutch 23 when the driver depresses the accelerator pedal 12 in rapid succession following panic brake application. With the drive-by-wire control arrangement of FIG. 1, re-opening of the engine throttle 15 can be delayed slightly to allow smooth re-engagement of clutch 23 to be completed at an appropriate fast-idle position of the throttle 15. Abrupt "tip in" and release of the accelerator pedal 12 can similarly be made acceptably smooth during the continuously locked-up powertrain operation that would be prevalent in the embodiment of FIGS. 1, 2 and 3.

From another perspective, refined drive-by-wire control will accommodate very early lockup of an entirely conventional torque converter in much the same way that it will accommodate the early lockup schedule inherent in FIG. 3. On the other hand, a conventional lockup torque converter already contains both an overrunning clutch and a friction clutch for carrying full engine torque, just as does the two-speed assembly 20. Moreover, the planetary gearset in the assembly 20 provides one extra forward (and reverse) speed ratio with little or no penalty in converter size.

From the much broader perspective of some of the appended claims, the two-speed torque converter 20 exemplifies one of several approaches for employing a hydrodynamic device in only the powerpath activated for the first transmission speed ratio. Using a dual chain drive arrangement in a transmission configuration for front wheel drive cars with transversely mounted engines illustrates an alternative way of establishing the requisite hydrodynamic and lockup powerpaths. In more detail, the largest domestic car manufacturers employ a design which locates the central axis of a 4-speed planetary geartrain in parallel with the axis of rotation for the engine crankshaft and its attached torque converter. Since a drive chain passes engine power from the torque converter to the 4-speed geartrain in this design, a second drive chain having a different speed ratio can be added to pass engine power directly from the engine crankshaft to the 4-speed geartrain through an added range type clutch (which obviates the need for a lockup clutch in the torque converter itself). Appropriate modification of speed ratio and inclusion of a one-way clutch, both in the original chain drive, complete the necessary modifications of this production design. This approach would not, however, duplicate the compactness of conversion to an extra speed ratio as achieved by the planetary gearset nested within the converter assembly 20, nor would it avoid the use of an extra overrunning clutch.

FEATURES FOR HIGH SPECIFIC OUTPUT ENGINES—The 1990 Gas Mileage Guide compiled by the U.S. Environmental Protection Agency lists some interesting fuel economy estimates for a compact car produced by a large domestic car company. One of the engines available in this compact car produces a rating of 180 horsepower from only 2.3 liters of piston displacement, while another engine available in the same car has the greater displacement of 3.1 liters, but provides a peak power of only 135 HP. The 180 HP engine produces the expected result of significantly faster all-out vehicle acceleration and at the same time exceeds the fuel economy of the less powerful 3.1 liter engine. The actual EPA estimates using a 5-speed manual transmission for both engines are 22/31 miles per gallon in city/highway driving for the 180 HP engine and 19/28 MPG for the 135 HP engine.

This seeming contradiction of higher power being paired with better fuel economy is not, however, obtained without serious compromise. More specifically, the 180 HP engine achieves its high specific power output at the substantial cost of relatively poor torque output at low and middle crankshaft speeds. So while the inherent torque converter characteristic of providing more torque multiplication at the lower crankshaft speeds where it is most needed would seem to be ideally suited for high specific output engines, the 180 HP engine now being considered is actually available only with a manual transmission. Which is to say, first, that ultimate performance with the 180 HP engine requires extreme driving techniques such as tire spinning or excessive clutch slippage, and second, that transmission gear ratio gaps narrower than in typical automatic transmissions are desirable. In reality, the planetary configuration depicted in FIG. 2 was chosen because, unlike other current production 4-speed planetary geartrains, it is amenable to the tightening of ratio gaps illustrated by those ratio gaps seen in FIG. 3.

Continuing then with the latter of the two preceding factors, the gear tooth numbers specified in FIGS. 1 and 2 provide gear ratio gaps which in effect duplicate the manual transmission ratio gaps that are actually used in production with the 180 HP engine of the present example. In particular, the 2nd-to3rd and 3rd-to-4th ratio gaps listed in FIG. 3 are each within about one percent of the corresponding gaps in the production manual transmission. Only the 4th-to-5th ratio gap in FIG. 3 deviates significantly from the corresponding production value for the 180 HP engine, but 5th gear would not be used for all-out acceleration. In addition, the 1st-to-2nd ratio gap given in FIG. 3 is numerically less than the corresponding production value in order to accommodate torque converter action in 1st gear. In any case, the first ratio gap for the preferred embodiment may be adjusted independently of the other gaps. And last, but not least, is the flexibility of gear ratio spacing afforded by the combination of a two-speed hydrodynamic unit like the assembly 20 with a 4-speed countershaft type of automatic transmission.

Now returning to the problem of excessive clutch slippage or tire spinning needed for initiating vehicle acceleration at elevated RPM of a high specific output engine, manual transmission gearing that is revised for greater overall torque multiplication in 1st gear does not offer a real solution to this problem because such revised gearing will provide too much torque multiplication when the engine reaches its torque peak. In contrast, the variable torque multiplication inherent in a torque converter does offer a solution, but not without creating another problem in that the high torque converter stall speeds desirable for high specific output engines lead to very rapid overheating of the converter when the driver uses power and braking at the same time.

Figure 4:
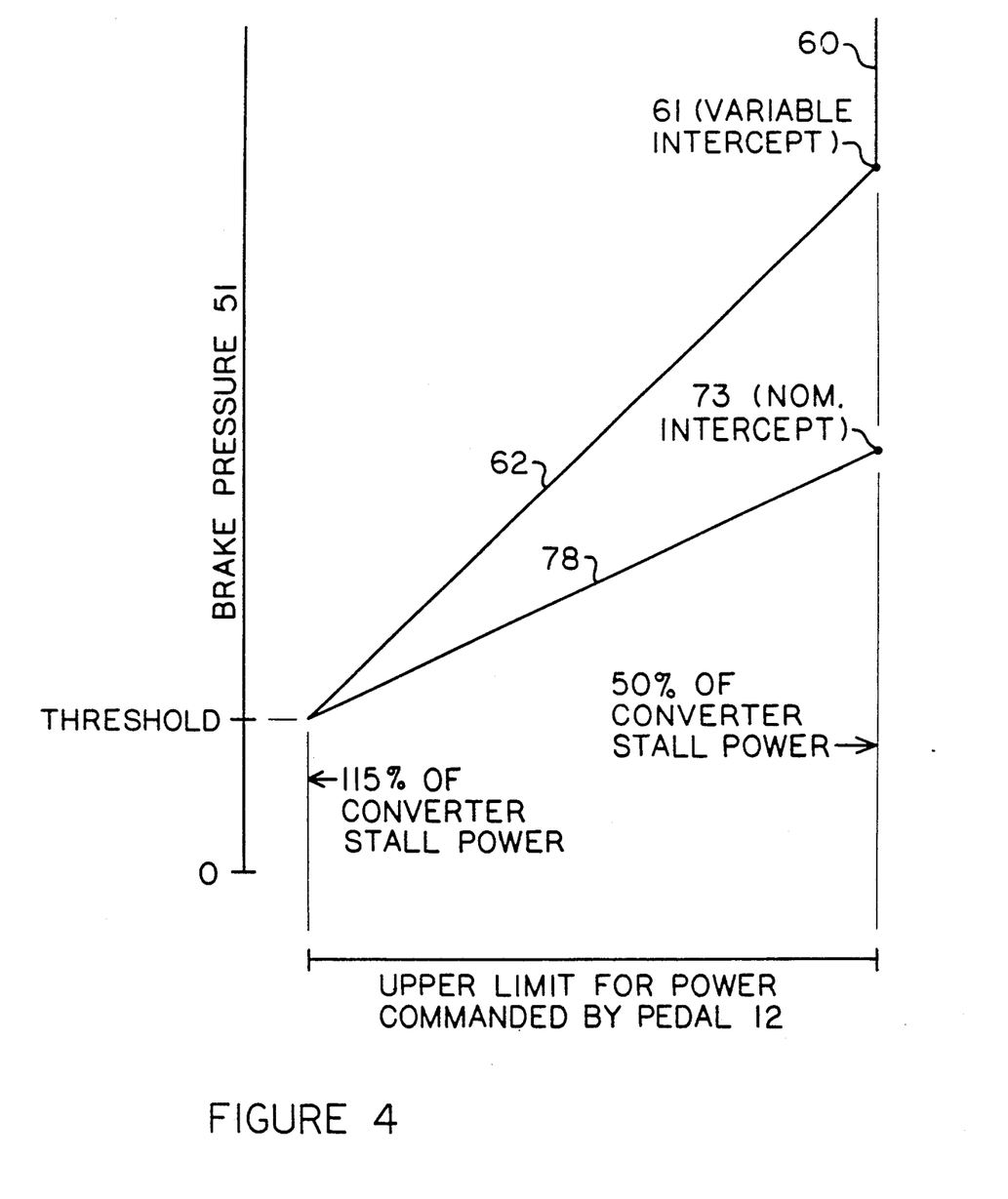
FIG. 4 is a graph showing how power output of the engine 10 in FIG. 1 is limited as function of vehicle brake application pressure.

Accordingly, FIG. 4 shows how the ECU 14 imposes an upper limit on the power commanded by the accelerator pedal 12 when a sensor 50 (in FIG. 1) indicates that hydraulic actuation pressure 51 in the braking system (not shown) of the associated vehicle exceeds an appropriate threshold. As a specific example, the driver might set the brake pressure 51 to a moderately high value, and then depress the accelerator pedal 12 shortly before reducing the brake pressure 51 to thereby initiate vehicle motion. This technique enhances all-out acceleration and is also helpful for starting the associated vehicle uphill without rolling backward, especially when the vehicle is heavily loaded as during trailer towing.

The initial release of brake pressure 51 in this example proceeds downward along the vertical line 60 located in FIG. 4 at 50% of torque converter stall power as the upper limit for power commanded by the accelerator pedal 12. The point 61 in FIG. 4 marks the intercept value at which motion of the associated vehicle is first detected, and further reduction in pressure 51 below the intercept 61 causes the limit for commanded power to follow the straight-line curve 62 for which point 61 is the intercept at the 50% level of stall power.

The foregoing approach is especially beneficial in the case of trailer towing because the upper limit for power commanded by the accelerator pedal 12 is progressively raised back to normal as the driver reduces the brake pressure 51. In other words, the driver does expect a reasonably progressive increase in forward driving force as the brake pressure 51 is reduced after the accelerator pedal 12 has been preset to a depressed position. (The pedal 12 is often preset to nullify a pre-existing rearward force on the associated vehicle.) The curve 62 in FIG. 4 verifies that the driver's expectation will be met because the restriction on commanded power will be progressively released as the vehicle brakes are progressively released. In marked contrast, an abrupt release of all restriction on commanded power for the engine 10 at a particular value of brake pressure 51 could cause a sudden surge of the associated vehicle at just the time when precise control of vehicle motion is needed.

The converter stall power referred to in FIG. 4 is nothing more than the wide open throttle power that the engine 10 produces when rotation of the geartrain input shaft 28 is completely stalled with the lockup clutch 23 released. The horizontal axis of FIG. 4 extends throughout the example range of from 50% to 115% of this stall power. For instance, if the ECU 14 uses the curve 62 to calculate a value of 75% of stall power as the upper limit for commanded power, then full depression of the accelerator pedal 12 will not command maximum power output from the engine 10, but rather 75% of the above stall power. As a result of this 75% limit, the maximum power dissipated by the torque converter assembly 20 with the associated vehicle stopped would be reduced by about 25%. The quantity of 115% of stall power is used as the lefthand extreme in FIG. 4 to accommodate variation in performance of the torque converter 20 and to accommodate some operation at low vehicle speed.

Figure 5:
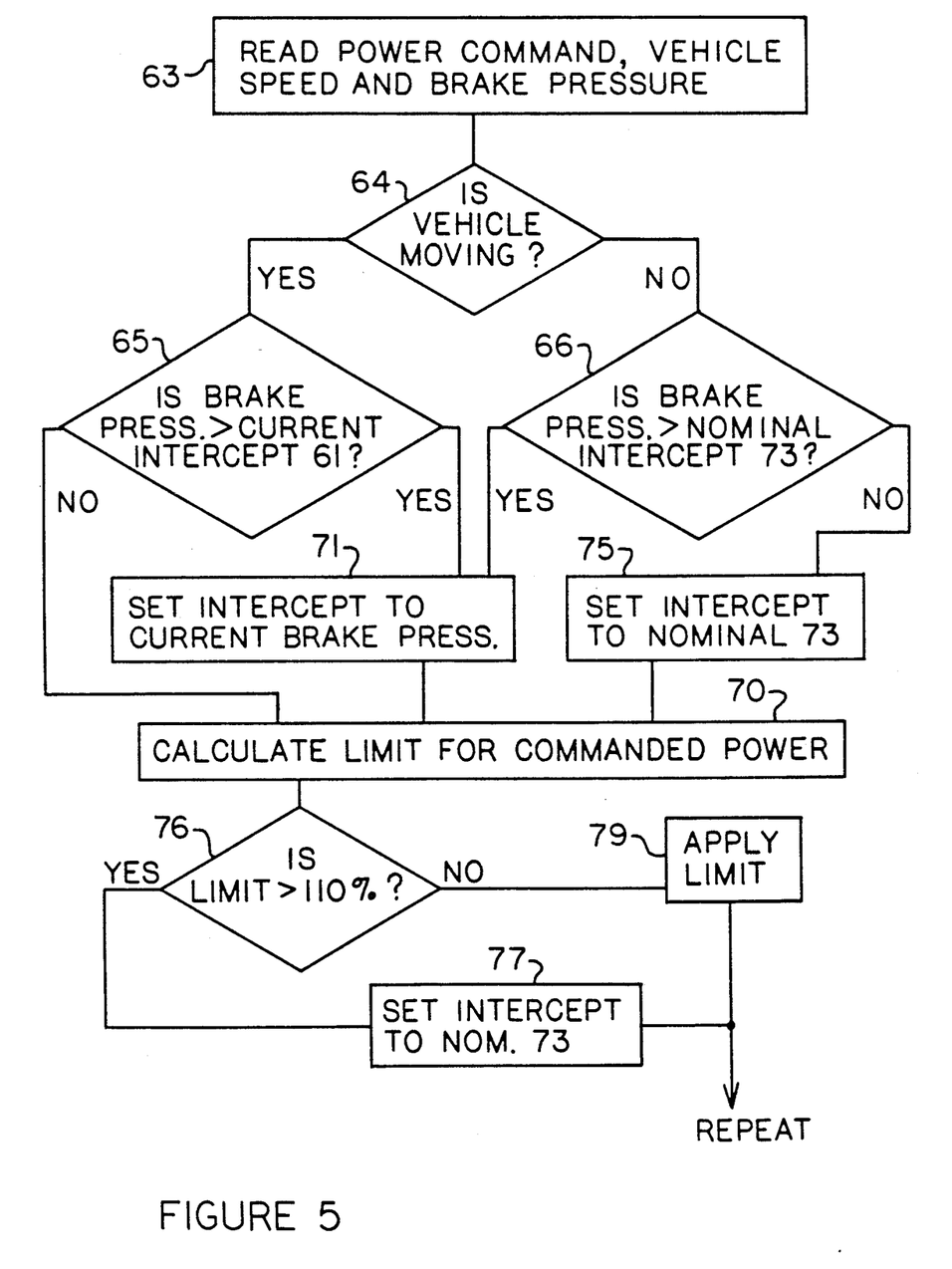
FIG. 5 is the flow chart for a procedure which the ECU 14 in FIG. 1 repeatedly implements in order to enforce the engine power limit graphed in FIG. 4.

In order to implement the curve 62 of FIG. 4, the ECU 14 continuously iterates through the procedure summarized by the flow chart of FIG. 5. Beginning then with the first step 63 in FIG. 5, the ECU 14 updates the power command, vehicle speed and brake pressure signals originated by the sensors 13, 25 and 50, respectively. Next, the ECU 14 performs the main branching step 64 using the speed of shaft 26 as just read in step 63. If the associated vehicle is moving, the shaft 26 will of course be turning and the ECU 14 will proceed to the sub-branching step 65. Otherwise the vehicle will be stopped and the ECU 14 will execute the alternative sub-branching step 66.

The lefthand sub-branching step 65 in FIG. 5 directly selects the calculation 70 of the upper limit for commanded power if the updated brake pressure from step 63 fails to exceed the current value of the intercept 61 in FIG. 4. If the updated pressure does exceed the intercept 61, then the step 65 initiates the setting 71 of the intercept 61 to the updated brake pressure before step 70 is executed.

In calculating the upper limit for commanded power, step 70 first positions the curve 62 in FIG. 4 according to the latest value of the intercept 61 for curve 62 and then uses the current updated value of brake pressure 51 to determine the upper limit for commanded power according to curve 62 and, if necessary, an extension of curve 62. If the resulting limit lies below 50%, then step 70 shifts the limit back to 50%.

The other sub-branching step 66 uses a comparison to the nominal intercept 73 in FIG. 4, the magnitude of which always remains constant at a value of the brake pressure 51 well below that which just prevents wide open throttle operation of the engine 10 from moving the associated vehicle when on level ground. If the updated brake pressure from step 63 fails to exceed the nominal intercept 73, then step 66 sets the variable intercept 61 to the nominal value 73 via step 75 before proceeding to step 70. Otherwise step 66 selects step 71 before proceeding to step 70.

After the limit for commanded power is calculated in step 70 as already explained, step 76 decides whether or not the limit should actually be applied. If the limit is more than 110% of converter stall power, then the step 76 completes the iteration routine of FIG. 5 by setting, in step 77, the intercept 61 to the nominal value 73 without applying the limit calculated in step 70. This deletion of the step 79 for applying the limit ensures full release of all restriction on power commanded by the accelerator pedal 12 whenever the brake pressure 51 drops below the threshold value shown in FIG. 4. In addition, the curve 62 is automatically reset, via step 77, to its nominal position 78 whenever the brakes in the associated vehicle are fully released.

With the iteration routine of FIG. 5 in mind, it is now clear why progressive release of the limit on commanded power normally begins just when it should, that is, when motion of the associated vehicle begins. Nevertheless, extreme circumstances might require release of the limit to begin before vehicle motion is initiated. The lower limit 78 for the curve 62 provides this early release. Moreover, the curve 78 also provides a desirable early application of the limit on commanded power in the instance that brake pressure 51 rises above the threshold shown in FIG. 4 while the associated vehicle is moving with the accelerator pedal 12 depressed.

Just as numerous modifications can be made in the configuration of the two-speed torque converter 20, there exists a virtual myriad of possibilities for implementing the progressive restoration of engine power output as exemplified by the straight-line curve 62 in FIG. 4. As one of the more radical examples of these possibilities, the ECU 14 could limit the power produced by the engine 10 using the multi-port fuel injection system (not shown separately) of the engine 10 rather than by using the throttle 15. Even though the ECU 14 would restrain engine power in such a scheme by terminating fuel injection to an appropriately varying combination of cylinders of the engine 10, the result would still be a basically progressive limiting of power. Terminating fuel injection according to a varying pattern of combustion cycles for individual cylinders would obviously enhance the progressive effect.

To introduce a much less radical example, the engines in some current production cars employ an auxiliary throttle valve in series with an entirely conventional (non-drive-by-wire) arrangement for the main throttle. Although the primary function of such auxiliary throttles is in traction control, they can also be used to enforce the progressive restriction of engine power output characterized by the curve 62.

As still another example, the intercept 61 redirects curve 62 upward onto the vertical segment 60 at a value of 50% of converter stall power, but this intercept percentage of stall power can vary from 50% and can in fact be a function of temperature of the transmission fluid in the converter 20. Specifically, the intercept value of 50% would be reduced below 50% as transmission fluid temperature rose above a suitable threshold. Not only would this technique directly increase protection of the converter 20 from overheating, but it would also encourage the driver of the associated vehicle to more accurately time presetting of the accelerator pedal 12 with the subsequent release of the vehicle service brake system.

In summary of the powertrain described with reference to FIGS. 1 through 5, the full performance potential of the high specific output engine 10 becomes much more usable than it would be with a current production manual transmission. In the first place, hydrodynamic action in the 2-speed torque converter 20 both precludes excessive clutch slippage at elevated engine RPM and augments the engine's torque curve in exactly the right places—at low and moderate crankshaft speeds. At the same time though, the ECU 14 limits power dissipated as heat in the converter 20 to thereby make the requisite high converter stall speed practical. The torque converter 20 also adds the extra forward speed ratio which facilitates the close spacing of gear ratios that is especially desirable with high specific output engines.

Without the early converter lockup inherently achieved in the preferred embodiment, aggressive gearshift scheduling would fail to return any improvement in fuel economy, especially in view of the preferred high stall speed for the torque converter 20. Automatic enforcement of aggressive gearshift scheduling with early converter lockup in turn means that, for most drivers, real-world fuel economy would surpass the corresponding levels achieved with a production manual transmission.

While the benefits realized with the present invention are most pronounced in the case of high specific output engines, they are still significant with more conservatively tuned engines. As the best illustration of this fact, early torque converter lockup will certainly improve the city-cycle fuel economy of any car equipped with an automatic transmission, and an extra automatic transmission gear ratio will just as certainly improve overall performance. Moreover, any automatic transmission would benefit from added protection against torque converter overheating.

Figure 6:
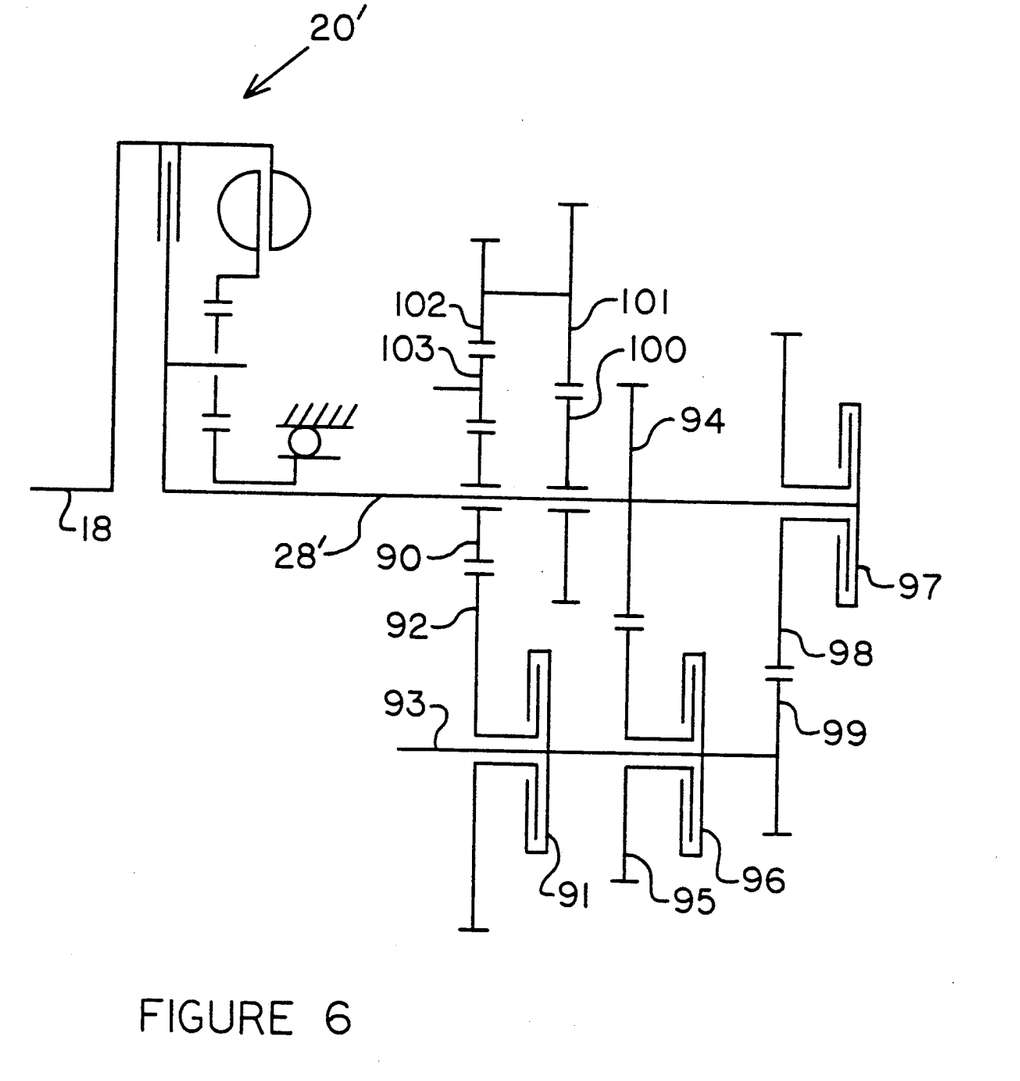
FIG. 6 shows an alternative automotive powertrain according to the present invention.

Finally, FIG. 6 combines two modifications of the invention that were mentioned earlier. First, the fluid coupling 20 prime in FIG. 6 adopts the basic two-speed configuration of the torque converter 20 in FIG. 1, except that the coupling 20 prime does not have a stator. Second, this coupling 20 prime delivers power from the engine crankshaft 18 to the input shaft 28 prime of a countershaft type of 3-speed automatic transmission for front wheel drive (FWD) passenger cars.

For operation of this FWD transmission in 1st and 2nd gear, a jaw clutch (not shown separately) connects the gear 90 to the input shaft 28 prime, and the friction clutch 91 engages the mating gear 92 to the countershaft 93. Whether the transmission of FIG. 6 is in 1st or 2nd gear depends on whether the fluid coupling 20 prime is locked up, thereby relieving the range clutch 91 of any requirement to ever execute the engagement process when full 1st gear torque is being delivered to the countershaft 93 by gear 92. Mating ears 94 and 95 combine with engagement of the associated range clutch 96 to effect the upshift from 2nd to 3rd gear when clutch 91 is simultaneously released, and components 97, 98 and 99 provide 4th gear. This simple and compact type of transmission can include additional forward speed ratios, and it can be adapted for use in rear wheel drive vehicles.

For operation in reverse, the 4th gear range clutch 97 is engaged to stall the input shaft 28 prime while both of the range clutch 91 and the lockup clutch in the fluid coupling 20 prime are kept disengaged. As a result, the reverse gear 100 can be connected to shaft 28 prime via a jaw clutch without any relative motion between gear 100 and shaft 28 prime. (In other words, the same jaw clutch selects either gear 90 or gear 100 for connection to shaft 28 prime, and the connection of either gear can be made without relative motion.) Next, range clutch 91 is engaged just before the release of range clutch 97 to thereby complete the shift to reverse and also ensure jaw clutch engagement. The reverse idler gears 101, 102 and 103 pass engine power back to gear 90 for operation in reverse, but the preferred configuration would employ a single compound reverse idler between gears 92 and 100. The more complex reverse gear arrangement was chosen for FIG. 6 because it illustrates the foregoing principles of operation in a single view.

A few variations of the present invention have already been outlined, but these variations do not define the full range of modifications that may be resorted to without departing from the spirit and scope of the following claims. As one example of this, the term "internal combustion engine" in the following claims has acquired a definition that is based on function rather than on configuration of hardware. The marked difference in physical configuration between a piston engine and a rotary Wankel engine confirms this conclusion. As even better confirmation, the established definition of "continuously variable transmission" includes such diverse hardware as electric motor-generator combinations, traction drives and hydrostatic transmissions. Accordingly, the following claims make their own functional definitions when no suitable functional definition has already been established.

What is claimed is:

1. Power transmission apparatus for expanding the speed and torque ranges of the mechanical power produced by an internal combustion engine, the apparatus comprising:

a powershift geartrain having an upshift sequence which includes all forward speed ratios available in upshifting sequence for powershift operation of said powershift geartrain, at least three forward speed ratios being in said upshift sequence and said upshift sequence having an upshift which is executed first and with which a first numerical gear ratio gap is associated, two-speed means which is coupled to deliver power from the engine to said powershift geartrain and which comprises (1) a hydrodynamic powerpath which delivers power from the engine to said powershift geartrain through a hydrodynamic device within said hydrodynamic powerpath and selected from fluid couplings and torque converters and (2) a lockup powerpath which delivers power from the engine to said powershift geartrain and in so doing bypasses said hydrodynamic device; said hydrodynamic powerpath having associated therewith a low speed ratio measured between the engine and said powershift geartrain and calculated using an assumption of a one-to-one speed ratio across said hydrodynamic device, said lockup powerpath having a high speed ratio also measured between the engine and said powershift geartrain, said high speed ratio being in the upshift direction from said low speed ratio and a lockup ratio gap being that numerical ratio gap which separates said high and said low speed ratios, and shift control means normally operative to initiate and proceed to completion of said upshift sequence in said powershift geartrain only when said lockup powerpath is being used to the exclusion of said hydrodynamic powerpath for delivering power from the engine to said powershift geartrain, whereby hydrodynamic losses are eliminated early during acceleration of a load driven by the engine through the power transmission device.

2. The transmission apparatus of claim 1 wherein said lockup ratio gap of said two-speed means is narrower than said first ratio gap associated with said upshift executed first in said upshift sequence of said powershift geartrain, whereby a comparatively narrow value for said lockup ratio gap (1) counteracts effective widening of said lockup ratio gap caused by slippage in said hydrodynamic device and (2) encourages earlier use of said lockup powerpath to thereby reduce hydrodynamic energy losses.

3. The transmission apparatus of claim 1 (a) wherein said hydrodynamic powerpath comprises said hydrodynamic device and planetary gearing connected in power transmitting series with said hydrodynamic device to thereby provide torque multiplication as power is being transmitted from the engine to said powershift geartrain; said planetary gearing comprising (1) a torque reaction assembly which includes a sun gear, rotation of which is selectively arrested by brake means with which said sun gear comprises said reaction assembly, (2) a ring gear which receives torque delivered to said planetary gearing as power is being transmitted from the engine to said powershift geartrain and (3) a planet carrier assembly which delivers torque from said planetary gearing as power is being transmitted from the engine to said powershift geartrain and which has at least one planet gear in meshing engagement with gear teeth of said sun gear and with gear teeth of said ring gear, and (b) wherein said lockup powerpath includes a lockup clutch for selectively coupling the engine to said powershift geartrain to thereby simultaneously bypass engine power around said hydrodynamic device and around said planetary gearing,
whereby said planetary gearing contributes to compactness of the transmission apparatus.

4. The transmission apparatus of claim 3 wherein said hydrodynamic device is a torque converter which has an impeller, a turbine and a stator, said ring gear being coupled to receive engine power from said turbine,
whereby said torque converter provides greater torque multiplication at lower operating speed of the engine.

5. The transmission apparatus of claim 4 wherein said stator and said sun gear both use said brake means to transfer their reaction torques to a non-rotating element of the transmission apparatus,
whereby said brake means transmits reaction torque for both of said sun gear and said stator to thereby contribute to compactness and reduced cost of the transmission apparatus.

6. The transmission apparatus of claim 5 wherein said brake means comprises an overrunning type of device exemplified by sprag and roller clutches,
whereby said brake means automatically releases upon engagement of said lockup clutch.

7. The transmission apparatus of claim 3 wherein said brake means comprises an overrunning type of device exemplified by sprag and roller clutches,
whereby said brake means automatically releases upon engagement of said lockup clutch.

8. The transmission apparatus of claim 1 wherein said shift control means is further operative to momentarily adjust to a more closed position a throttle valve device interposed in a flow of combustion air consumed by the engine, said momentary closing of said engine throttle valve being employed by said shift control means to reduce torque loading of said powershift geartrain when operating speed of the engine is being abruptly reduced by powershifting of said geartrain in the upshift direction,
whereby energy dissipated by said powershift geartrain during upshifting is not abnormally high even though said hydrodynamic device is not available during upshifting to dissipate engine inertia energy.

9. The transmission apparatus of claim 8 wherein said engine throttle valve also regulates engine torque output in response to an accelerator pedal,
whereby an extra engine throttle valve is not required.

10. The power transmission apparatus of claim 3 wherein said ring gear is coupled to receive engine power from said hydrodynamic device and wherein said planet carrier assembly is employed to deliver said engine power to said powershift geartrain,
whereby said hydrodynamic device carries only engine torque rather than engine torque multiplied by said planetary gearing.

11. The power transmission apparatus of claim 7 wherein said hydrodynamic device is a fluid coupling,
whereby the added size and complexity of a hydrodynamic stator are avoided.

12. The transmission apparatus of claim 3 wherein said powershift geartrain comprises (1) an input shaft whose axis of rotation coincides with a common axis of rotation shared by said planetary gearing and said hydrodynamic device, (2) a layshaft whose axis of rotation is in parallel with but offset from said common axis of rotation, (3) at least two pairs of gears, each pair of which is utilized for disengageably coupling said input shaft to drive said layshaft in a common direction of rotation but through a different speed ratio, a first pair of said at least two pairs of gears providing a speed reduction ratio from said input shaft to said layshaft numerically greater than provided by any other of said at least two pairs of gears and (4) a first-gear range clutch for selectively coupling a power output gear of said first pair of gears to drive said layshaft, said power output gear being free to rotate at various speeds relative to said layshaft when said first-gear range clutch is disengaged and said first-gear range clutch comprising a friction clutch,
whereby said first pair of gears idles at reduced speeds and whereby said shift control means enables said lockup powerpath to thereby reduce layshaft torque before said first-gear range clutch is progressively released during a subsequent upshift, thus reducing the torque requirement for said first-gear range clutch during slipping of said first-gear range clutch.

13. Power transmission apparatus for expanding the speed and torque ranges of the mechanical power produced by an internal combustion engine, the apparatus comprising:
a hydrodynamic device selected from fluid couplings and torque converters, said hydrodynamic device having a power input element and a power output element,
planetary gearing comprising a sun gear, a ring gear and a planet carrier assembly having at least one planet gear in meshing engagement with teeth on said sun gear and with teeth on said ring gear, said ring gear being coupled to receive engine power from said output element of said hydrodynamic device and said planet carrier being adapted to deliver engine power from said planetary gearing; and elements comprising said ring gear, said sun gear, said planet carrier assembly, said hydrodynamic input element and said hydrodynamic output element all sharing a common axis of rotation and all sharing space in a common rotating assembly,
brake means operative to automatically prevent rotation of said sun gear in a direction opposite to forward rotation of the engine, said brake means consisting of an overrunning type of device exemplified by sprag and roller clutches, and a lockup clutch for selectively coupling said planet carrier assembly to said power input element of said hydrodynamic device to thereby bypass engine power around said hydrodynamic device, whereby engagement of said lockup clutch upshifts the transmission apparatus and at the same time locks up said hydrodynamic device to thereby substantially eliminate hydrodynamic losses.

14. The transmission apparatus of claim 13 further comprising (1) a powershift geartrain which has at least two different forward speed ratios and which is coupled to receive engine power from said planet carrier assembly and (2) shift control means for executing gearshifts in said powershift geartrain and for controlling said lockup clutch, said shift control means being operative to (1) engage said lockup clutch to thereby simultaneously (a) lock up said device and (b) complete a first upshift for initiating a full sequence of upshifts for the transmission apparatus, and (2) execute upshifts in said powershift geartrain to complete said full upshift sequence, said full upshift sequence including all forward speed ratios available in upshifting sequence for powershift operation of said geartrain, and all upshifts in said full upshift sequence that are subsequent to said first upshift being directly preceded and directly followed by engagement of said lockup clutch, whereby hydrodynamic losses are eliminated early during acceleration of a load driven by the engine through the transmission apparatus.

15. The transmission apparatus of claim 14 wherein said powershift geartrain has at least three different forward speed ratios and wherein said first upshift has associated therewith a first numerical gear ratio gap for said full upshift sequence, said first ratio gap being calculated using an assumption of a one-to-one speed ratio across said hydrodynamic device and said full upshift sequence having a second upshift which directly follows said first upshift and said second upshift having associated therewith a numerical gear ratio gap which is wider than said first gear ratio gap, whereby a comparatively narrow value of said first ratio gap (1) counteracts effective widening of said first ratio gap caused by hydrodynamic slippage and (2) encourages earlier execution of said first upshift to thereby reduce hydrodynamic energy losses.

16. The transmission apparatus of claim 14 wherein said powershift geartrain comprises (1) an input shaft whose axis of rotation coincides with said common axis of rotation shared by said planetary gearing and said hydrodynamic device, (2) a layshaft whose axis of rotation is in parallel with but offset from said common axis of rotation, (3) at least two pairs of gears, each pair of which is utilized for disengageably coupling said input shaft to drive said layshaft in a common direction of rotation but through a different speed ratio, a first pair of said at least two pairs of gears providing a speed reduction ratio from said input shaft to said layshaft numerically greater than provided by any other of said at least two pairs of gears and (4) a first-gear range clutch for selectively coupling a power output gear of said first pair of gears to drive said layshaft, said power output gear being free to rotate at various speeds relative to said layshaft when said first-gear range clutch is disengaged and said first-gear range clutch comprising a friction clutch, whereby said first pair of gears idles at reduced speeds and whereby said shift control means engages said lockup clutch to thereby reduce layshaft torque before said first-gear range clutch is progressively released during a subsequent upshift, thus reducing the torque requirement for said first-gear range clutch during slipping of said first-gear range clutch.

17. The transmission apparatus of claim 13 further comprising (1) a powershift geartrain coupled to receive engine power from said planet carrier assembly and (2) control means operative to control said lockup clutch and other control elements in the transmission apparatus to thereby automatically enable an upshift sequence having at least three upshifts of the transmission apparatus; the transmission apparatus having a first-gear ratio which (a) is a speed reduction ratio calculated using an assumption of a one-to-one speed ratio across said hydrodynamic device and (b) has a value greater than that for any other speed reduction ratio in the transmission apparatus, said first-gear ratio being in said upshift sequence and being the only speed ratio in said upshift sequence which utilizes said planetary gearing to multiply torque, whereby gear meshing action in said planetary gearing is eliminated early during acceleration of a load driven through the transmission apparatus while using said upshift sequence.

18. A two-speed hydrodynamic device for replacing a conventional single-speed torque converter or fluid coupling assembly in a multi-speed transmission to thereby provide at least one extra forward speed ratio for the transmission, the two-speed device comprising:

a hydrodynamic impeller for imparting energy to a fluid, said impeller being employed to receive input power delivered to the transmission, a hydrodynamic turbine or runner for extracting said energy from said fluid, planetary gearing comprising a sun gear, a ring gear and a planet carrier assembly having at least one planet gear in meshing engagement with teeth on said sun gear and with teeth on said ring gear, said ring gear being coupled to receive said input power from said hydrodynamic turbine or runner, said planet carrier being employed to deliver power from the two-speed device to remaining components of the transmission; and said hydrodynamic impeller, said hydrodynamic turbine or runner, said sun gear, said ring gear and said planet carrier assembly all sharing a common axis of rotation and all sharing space in a common rotating assembly, brake means for automatically engaging to prevent rotation of said sun gear in a direction opposite to forward rotation of said hydrodynamic turbine or runner, said brake means consisting of an overrunning type of device exemplified by roller and sprag clutches, and a lockup clutch for selectively coupling said planet carrier assembly to said hydrodynamic impeller to thereby substantially eliminate hydrodynamic losses associated with said imparting and said extracting of energy from said fluid, whereby engagement of said lockup clutch executes an upshift of the transmission and at the same time eliminates said hydrodynamic losses.

19. The two-speed device of claim 18 wherein said hydrodynamic impeller drives said hydrodynamic turbine or runner through a constant one-to-one torque ratio, whereby the added size and complexity of a hydrodynamic stator are avoided.

20. The two-speed device of claim 18 further comprising control means for the transmission as it includes the two-speed device, said control means being operative to control said lockup clutch and other control elements in the transmission to thereby automatically enable an upshift sequence having at least three upshifts of the transmission as it includes the two-speed device; the transmission as it includes the two-speed device having a first-gear ratio which (a) is a speed reduction ratio calculated using an assumption of a one-to-one speed ratio between said hydrodynamic impeller and said hydrodynamic turbine or runner and (b) has a value greater than that for any other speed reduction ratio in the transmission as it includes the two-speed device, said first-gear ratio being in said upshift sequence and being the only speed ratio in said upshift sequence which utilizes said planetary gearing of the two-speed device to multiply torque as power passes through the transmission, whereby gear meshing action in said planetary gearing of the two-speed device is eliminated early during acceleration of a load driven through the transmission while using said upshift sequence.

* * * * *